Patented Sept. 19, 1939

2,173,324

UNITED STATES PATENT OFFICE 2,173,324

DIAZOAMINO COMPOUND

Albert Schmelzer, Cologne, and Eberhard Stein, Leverkusen-Schlebusch, Germany, assignors to General Aniline Works, Inc., New York, N. Y., a corporation of Delaware No Drawing. Application November 26, 1938, Serial No. 242,628. In Germany December 1, 1937

3 Claims. (Cl. 260—140)

The present invention relates to new water-soluble diazoamino compounds, more particularly it relates to compounds of the following general formula (1) 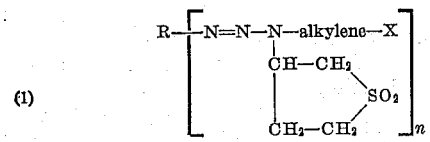

In this formula R stands for an aromatic radical, X stands for an acid salt-forming group and $n$ for one of the numbers 1 and 2.

Our new diazoamino compounds can be obtained in the usual manner, for instance, by reacting diazo compounds of aromatic amines with a compound of the following formula (2) 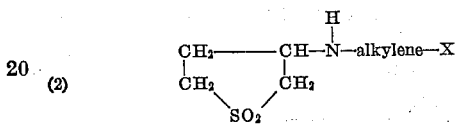

wherein X means the same as stated above. As aromatic diazo compounds preferably such are used as are free from carboxylic and sulfonic groups.

Our new diazoamino compounds are obtained generally as colorless to yellowish to brown crystals.

By the addition of acids or salts of acid action the new diazoamino compounds are split up into the starting components, i. e. into a diazo or tetrazo compound and into the stabiliser of the above Formula 2. The diazoamino compounds can, therefore, be employed in the preparation of azodyestuffs according to U. S. Patents 1,882,560 and 1,882,561.

The stabilisers used for the preparation of the diazoamino compounds are obtainable by reacting 3-tetramethylenesulfone-amine (obtained for instance according to application Ser. No. 186,085, filed January 21, 1938) with halogen-alkylcarboxylic or halogenalkylsulfonic acids.

According to the process in which the new diazoamino compounds will be employed they may be used in the form of salts of various metals. For the purpose of the above mentioned U. S. Patents 1,882,560 and 1,882,561 they are preferably used in the form of alkali metal salts; for the purpose of U. S. Patent 2,125,087 and Ser. No. 242,575 (application of even date entitled "Process and preparations for the manufacture of azodyestuffs") they may be used in the form of salts with volatile bases; in processes where the presence of substances of buffer-action is desired they may be employed for instance in the form of magnesium salts.

The following examples illustrate the invention without, however, restricting it thereto, the parts being by weight.

Example 1

28.6 parts of 4-chloro-2-toluidine are finely suspended with 200 parts of water and 77 parts of crude hydrochloric acid and at 10–12° C. diazotised with a solution of 14.3 parts of sodium nitrite in 30 parts of water. The filtered diazo solution is added drop by drop at a temperature below 10° C. to a solution of 42.5 parts of 3-tetramethylenesulfone-glycine of the formula

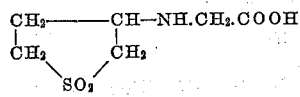

(melting-point 252° C.)

and 50 parts of anhydrous sodium carbonate in 300 parts of water while stirring well. After 4–5 hours' stirring the diazo compound can no longer be detected. In order to completely precipitate the diazoamino compound 200 parts of sodium chloride are added. The diazoamino compound of the following constitution

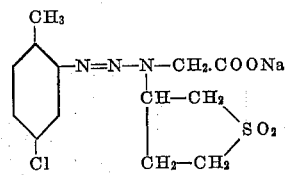

is filtered off and dried in the drying oven at 40° C. The compound is colorless.

Example 2

61.6 parts of 2.5-diethoxy-4-benzoylamino-1-amino-benzene are suspended in 65 parts of water and 110 parts of crude hydrochloric acid and diazotised at 20–25° C. with 17.9 parts of sodium nitrite in 45 parts of water. The filtered diazo solution is added drop by drop at a temperature below 10° C. to a solution of 42.5 parts of 3-tetramethylenesulfoneglycine and 60 parts anhydrous sodium carbonate in 300 parts of water. After 16 hours' stirring the coupling is complete. The diazoamino compound of the following formula

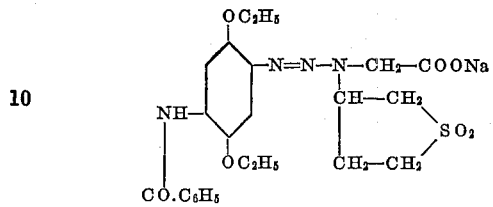

is sucked off and dried in the drying oven at 40° C. The compound shows a brownish coloration.

*Example 3*

If in Example 2 instead of 3-tetramethylensulfone-glycine 53.5 parts of 3-tetramethylenesulfone-taurine are used the diazoamino compound of the following formula

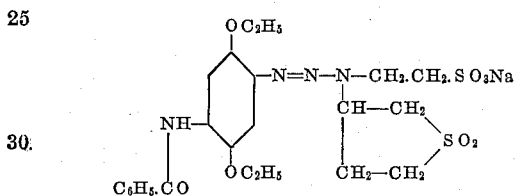

is obtained.

*Example 4*

28.6 parts of 4-chloro-2-toluidine are diazotised according to Example 1. The filtered diazo solution is added drop by drop at a temperature below 10° C. to a solution of 42.5 parts of 3-tetramethylenesulfone-glycine in 200 parts of water in the presence of 25 parts of magnesium oxide while stirring well. After 16 hours' stirring the yellowish colored diazoamino compound of the following constitution

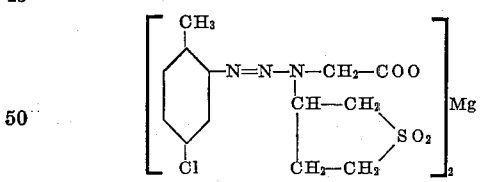

has separated.

If instead of 4-chloro-2-toluidine 5-chloro-2-toluidine is used the diazoamino compound of the following constitution is obtained

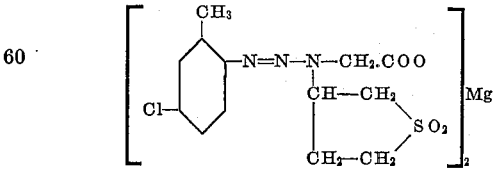

*Example 5*

31.8 parts of para-toluidine are suspended in 140 parts of water and 113.5 parts of crude hydrochloric acid and diazotised below 10° C. with 21.5 parts of sodium nitrite in 45 parts of water. The diazo solution is filtered and added drop by drop to a solution of 64 parts of 3-tetramethylenesulfoneglycine and 115 parts of ammonium carbonate in 330 parts of water. After 20 hours' stirring the precipitated diazamino compound of the following constitution

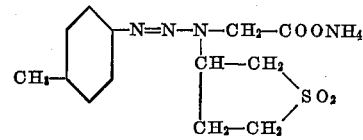

is sucked off and dried as usual. The compound is weakly yellowish colored.

*Example 6*

The diazo solution prepared according to Example 5 is added drop by drop to a solution of 64 parts of tetramethylenesulfoneglycine in 500 parts of water in the presence of 34 parts of magnesium oxide. The product is worked up according to Example 5. The faintly yellowish colored diazoamino compound has the following constitution

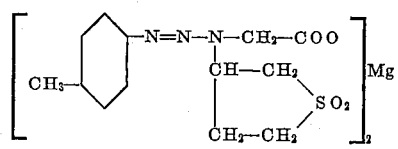

*Example 7*

82 parts of 2-methoxy-4-benzoylamino-5-methyl-1-aminobenzene are suspended in 300 parts of water and 113.5 parts of crude hydrochloric acid and diazotised at 15–20° C. with 26.4 parts of sodium nitrite dissolved in 60 parts of water. The filtered diazo solution is added drop by drop at 10–20° C. to a solution of 64 parts of 3-tetramethylenesulfoneglycine and 60 parts of anhydrous sodium carbonate in 100 parts of water while stirring well. After about 18 hours' stirring the diazoamino compound is salted out by adding 250 parts of sodium chloride; the diazoamine compound shows a faint brownish coloration and corresponds to the following constitution

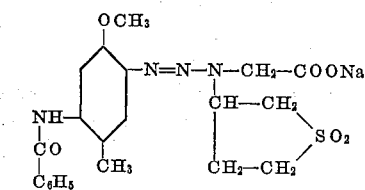

*Example 8*

The diazo solution prepared according to Example 5 is added drop by drop at a temperature below 10° C. to a solution of 64 parts of 3-tetramethylenesulfone glycine and 60 parts of anhydrous sodium carbonate in 350 parts of water. After about 20 hours' stirring the diazoamino compound of the following constitution

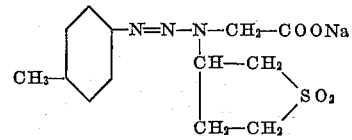

is salted out by adding 150 parts of sodium chloride. It is sucked off and dried as usual. The compound is faintly yellowish colored.

*Example 9*

77.1 parts of 2-amino-1-methoxybenzene-4-sulfodiethylamide are dissolved in 280 parts of water and 113.5 parts of crude hydrochloric acid and diazotised at 10–15° C. with 20.9 parts of sodium nitrite in 45 parts of water. The filtered diazo solution is added drop by drop at a temperature below 10° C. to a solution of 64 parts of 3-tetramethylensulfone-glycine and 70 parts of anhydrous sodium carbonate in 330 parts of water while stirring well. After 4 hours' stirring 300 parts of sodium chloride are added to precipitate the diazo-amino compound. The faintly reddish colored compound of the following constitution.

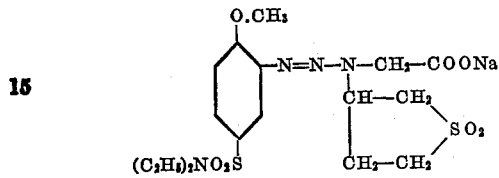

is sucked off, washed with 1000 parts of a saturated sodium chloride solution and dried at 40° C.

We claim:

1. As new products diazoamino compounds of the general formula

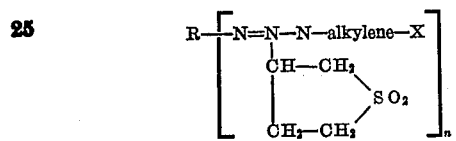

wherein R stands for an aromatic radical, free from carboxylic and sulfonic groups, X stands for an acid salt forming group and $n$ for one of the numbers 1 and 2.

2. As new products diazoamino compounds of the general formula

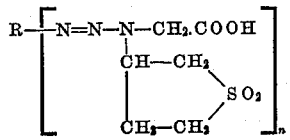

wherein R stands for an aromatic radical, free from carboxylic and sulfonic groups, and $n$ for one of the numbers 1 and 2.

3. As new products diazoamino compounds of the general formula

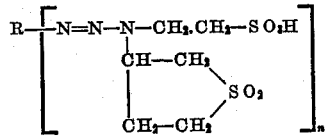

wherein R stands for an aromatic radical, free from carboxylic and sulfonic groups, and $n$ for one of the numbers 1 and 2.

ALBERT SCHMELZER.
EBERHARD STEIN.